(12) United States Patent
Woloszyk et al.

(10) Patent No.: US 10,518,924 B2
(45) Date of Patent: Dec. 31, 2019

(54) CONTAINER BASE INCLUDING HEMISPHERICAL ACTUATING DIAPHRAGM

(71) Applicant: AMCOR RIGID PLASTICS USA, LLC, Wilmington, DE (US)

(72) Inventors: Mark Woloszyk, Chelsea, MI (US); Omkar Dole, Ann Arbor, MI (US); David Downing, Manchester, MI (US); Kirk Edward Maki, Tecumseh, MI (US); Bradley S. Philip, Tecumseh, MI (US); James Stelzer, South Lyon, MI (US); Luke A. Mast, Brooklyn, MI (US); Richard J. Steih, Jackson, MI (US)

(73) Assignee: AMCOR RIGID PLASTICS USA, LLC, Wilmington, DE (US)

(*) Notice: Subject to any disclaimer, the term of this patent is extended or adjusted under 35 U.S.C. 154(b) by 68 days.

(21) Appl. No.: 15/505,525

(22) PCT Filed: Aug. 20, 2015

(86) PCT No.: PCT/US2015/046123
§ 371 (c)(1),
(2) Date: Feb. 21, 2017

(87) PCT Pub. No.: WO2016/029023
PCT Pub. Date: Feb. 25, 2016

(65) Prior Publication Data
US 2017/0267392 A1 Sep. 21, 2017

Related U.S. Application Data

(60) Provisional application No. 62/138,190, filed on Mar. 25, 2015, provisional application No. 62/040,277, filed on Aug. 21, 2014.

(51) Int. Cl.
*B65D 1/02* (2006.01)
*B65D 79/00* (2006.01)
(Continued)

(52) U.S. Cl.
CPC ............ *B65D 1/0276* (2013.01); *B29C 49/12* (2013.01); *B29C 49/46* (2013.01); *B65D 79/005* (2013.01);
(Continued)

(58) Field of Classification Search
CPC ....... B29C 49/12; B29C 49/46; B65D 1/0276; B65D 79/005
(Continued)

(56) References Cited

U.S. PATENT DOCUMENTS 2,339,763 A   1/1944   Calleson
3,409,167 A   11/1968  Blanchard
(Continued)

FOREIGN PATENT DOCUMENTS

CA   2499928 A1   4/2004
JP   S5717730 A   1/1982
(Continued)

OTHER PUBLICATIONS

U.S. National Phase of PCT/US2014/052148, Filing Date Feb. 21, 2017, Lane.
(Continued)

*Primary Examiner* — J. Gregory Pickett
*Assistant Examiner* — Niki M Eloshway
(74) *Attorney, Agent, or Firm* — Harness, Dickey & Pierce, P.L.C.

(57) ABSTRACT

A container including a finish defining an opening at a first end of the container that provides access to an internal volume defined by the container. A base portion of the container includes a diaphragm that is concave relative to an
(Continued)

exterior of the container. The diaphragm extends from a standing surface of the container to a center push-up portion of the base portion. The standing surface is at a second end of the container opposite to the first end. The diagram is configured to move from an as-blown first configuration to a second configuration in which the diaphragm is closer to the first end as compared to the first configuration in order to reduce residual vacuum within the container. The diaphragm is generally hemispherical in cross-section when in the second configuration.

8 Claims, 6 Drawing Sheets

(51) Int. Cl.
  *B29C 49/12* (2006.01)
  *B29C 49/46* (2006.01)
  *B65D 90/32* (2006.01)
  *B65D 23/00* (2006.01)
  *B29K 101/12* (2006.01)
  *B29K 105/00* (2006.01)
  *B29L 31/00* (2006.01)

(52) U.S. Cl.
  CPC ............. *B29C 2049/4652* (2013.01); *B29C 2049/4664* (2013.01); *B29K 2101/12* (2013.01); *B29K 2105/258* (2013.01); *B29L 2031/7158* (2013.01); *B65D 23/00* (2013.01)

(58) Field of Classification Search
  USPC .............. 220/624, 721, 609; 215/373, 371
  See application file for complete search history.

(56) References Cited

U.S. PATENT DOCUMENTS

| | | |
|---|---|---|
| 3,870,181 A | 3/1975 | Sincock |
| 4,082,200 A | 4/1978 | Guest et al. |
| 4,108,324 A | 8/1978 | Krishnakumar et al. |
| 4,331,246 A | 5/1982 | Sorensen |
| 4,342,398 A | 8/1982 | Chang |
| 4,598,831 A | 7/1986 | Nakamura et al. |
| 4,836,398 A | 6/1989 | Leftault, Jr. et al. |
| 4,863,046 A | 9/1989 | Collette et al. |
| 4,993,566 A | 2/1991 | Eberle |
| 4,993,567 A | 2/1991 | Eberle, Jr. |
| 5,141,121 A | 8/1992 | Brown et al. |
| 5,503,283 A | 4/1996 | Semersky |
| 5,642,826 A | 7/1997 | Melrose |
| 6,299,007 B1 | 10/2001 | Takeuchi |
| 7,900,425 B2* | 3/2011 | Bysick ............. B65D 1/0276 53/440 |
| 8,590,729 B2* | 11/2013 | Kamineni ........... B65D 1/0276 220/608 |
| 9,085,387 B2* | 7/2015 | Kurihara ............. B65D 1/0276 |
| 9,463,900 B2* | 10/2016 | Nakayama ........... B65D 23/001 |
| 9,751,679 B2* | 9/2017 | Stelzer ................ B65D 79/005 |
| 9,969,517 B2* | 5/2018 | Melrose ................ B65B 61/24 |
| 9,994,378 B2* | 6/2018 | Wurster ............... B65D 1/0276 |
| 2003/0196926 A1 | 10/2003 | Tobias et al. |
| 2005/0017013 A1 | 1/2005 | Peisach et al. |
| 2008/0047964 A1* | 2/2008 | Denner ................. B29C 49/06 220/624 |
| 2008/0257856 A1 | 10/2008 | Melrose et al. |
| 2011/0017700 A1 | 1/2011 | Patcheak et al. |
| 2012/0037645 A1 | 2/2012 | Boukobza |
| 2012/0061410 A1* | 3/2012 | Kamineni ........... B65D 1/0223 220/721 |
| 2012/0181246 A1 | 7/2012 | Ross et al. |
| 2013/0001235 A1 | 1/2013 | Patcheak et al. |
| 2013/0087954 A1 | 4/2013 | Tsuchiya |
| 2013/0206719 A1 | 8/2013 | Tanaka et al. |
| 2013/0220968 A1 | 8/2013 | Imai et al. |
| 2013/0240477 A1 | 9/2013 | Saito et al. |
| 2013/0248539 A1 | 9/2013 | Schneider et al. |
| 2013/0312368 A1 | 11/2013 | Denner et al. |
| 2014/0069937 A1 | 3/2014 | Melrose et al. |
| 2014/0109517 A1 | 4/2014 | Melrose |
| 2014/0209558 A1* | 7/2014 | Wright ................ B65D 1/0276 215/376 |
| 2015/0008210 A1 | 1/2015 | Oshino et al. |
| 2016/0311599 A1* | 10/2016 | Stelzer ............... B65D 79/005 |

FOREIGN PATENT DOCUMENTS

| | | |
|---|---|---|
| JP | 2000128140 A | 5/2000 |
| JP | 2008024314 A | 2/2008 |
| JP | 2013154907 A | 8/2013 |
| WO | WO-2006034231 A1 | 3/2006 |

OTHER PUBLICATIONS

U.S. National Phase of PCT/US2015/046110, Filing Date Feb. 21, 2017, Mast, et al.
Supplementary European Search Report issued in corresponding European Patent Application No. 15833820.2 dated Feb. 20, 2018.
Supplementary European Search Report issued in European Patent Application No. 15833351.8 dated Feb. 21, 2018 which corresponds to co-pending U.S. Appl. No. 15/505,517.
U.S. Appl. No. 15/505,517, filed Feb. 21, 2017, Mast et al.
International Search Report and Written Opinion of the ISA for PCT/US2015/046123, dated Nov. 24, 2015; ISA/KR.
International Search Report and Written Opinion of the ISA for PCT/US2014/052148, dated May 19, 2015; ISA/KR.
International Search Report and Written Opinion of the ISA for PCT/US2015/046110, dated Nov. 10, 2015; ISA/KR.

* cited by examiner

CONTAINER BASE INCLUDING HEMISPHERICAL ACTUATING DIAPHRAGM

CROSS-REFERENCE TO RELATED APPLICATIONS

This application is a U.S. National Phase Application under 35 U.S.C. 371 of International Application No. PCT/US2015/046123, filed on Aug. 20, 2015 and published in English as WO 2016/029023 A1 on Feb. 25, 2016. This application claims the benefit of U.S. Provisional Patent Application No. 62/138,190 (filed on Mar. 25, 2015) and U.S. Provisional Patent Application No. 62/040,277 (filed on Aug. 21, 2014), the entire disclosures of all of which are incorporated herein by reference.

FIELD

The present disclosure relates to a container base including a hemispherical actuating diaphragm.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

While current containers are suitable for their intended use, they are subject to improvement. For example, a reduced weight container that can immediately respond to internal vacuum created during filling in order to reduce the risk of the container being damaged on the fill line, and that can induce a positive pressure within the container to help fix and prevent denting of the container, would be desirable.

SUMMARY

This section provides a general summary of the disclosure, and is not a comprehensive disclosure of its full scope or all of its features.

The present teachings provide for a container including a finish defining an opening at a first end of the container that provides access to an internal volume defined by the container. A base portion of the container includes a diaphragm that is concave relative to an exterior of the container. The diaphragm extends from a standing surface to a center push-up portion of the base portion. The standing surface is at a second end of the container opposite to the first end. The diaphragm is configured to move from an as-blown first configuration to a second configuration in which the diaphragm is closer to the first end as compared to the first configuration in order to at least one of reduce residual vacuum within the container or create a positive pressure within the container. The diaphragm is generally hemispherical in cross-section when in the second configuration.

The present teachings further provide for a container including a finish and a base portion. The finish defines an opening at a first end of the container that provides access to an internal volume defined by the container. The base portion includes a diaphragm that is concave relative to an exterior of the container. An outer portion of the diaphragm extends from a standing surface of the container to a transitional radius of the diaphragm. An inner portion of the diaphragm extends from the transitional radius to a center push-up portion of the base portion. The standing surface is at a second end of the container opposite to the first end. The diaphragm is configured to move from an as-blown configuration to an activated configuration. As the diaphragm moves from the as-blown first configuration to the second configuration, the outer portion of the diaphragm moves away from the first end of the container and the inner portion of the diaphragm moves towards the first end of the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
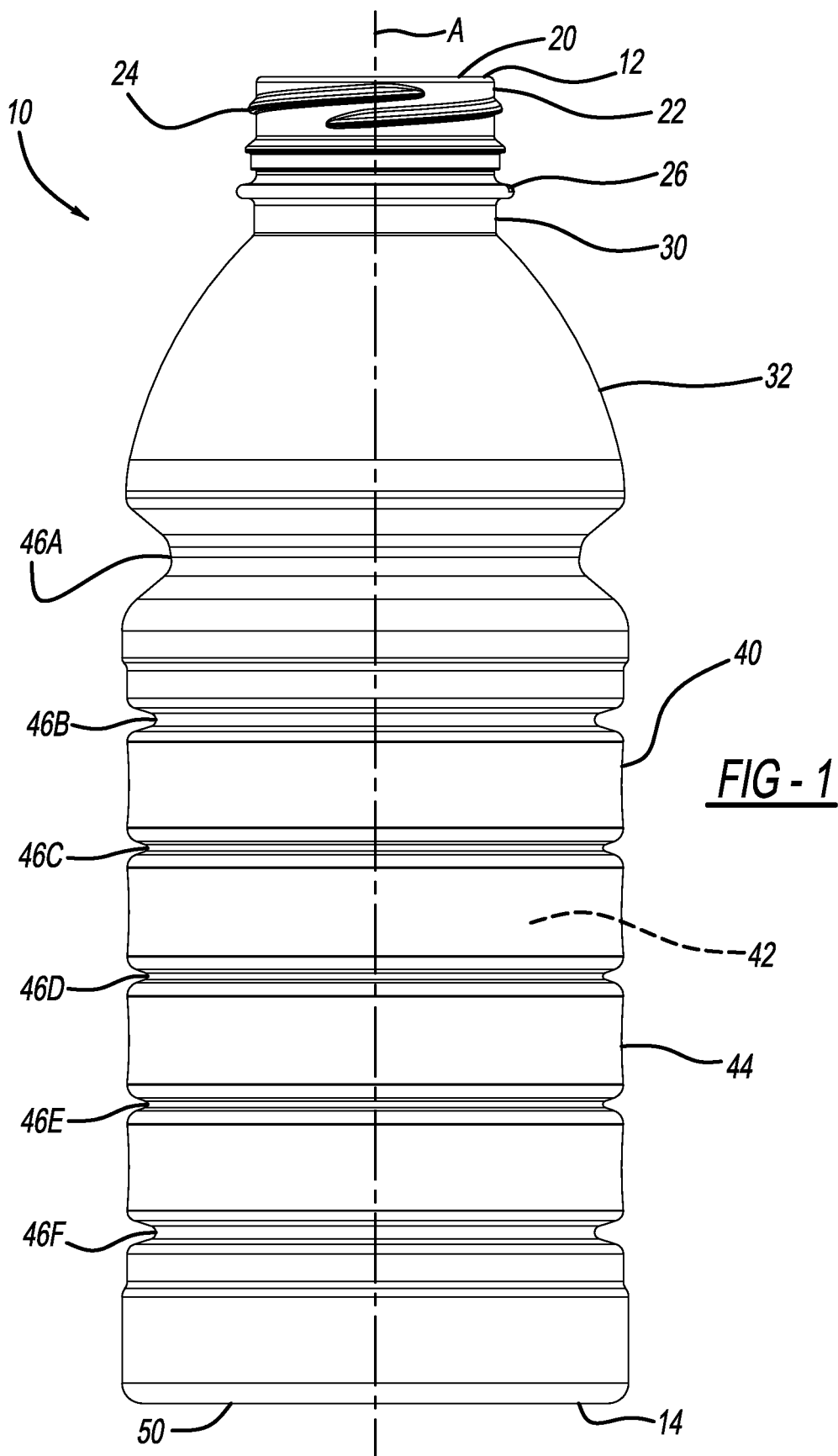
FIG. 1 is a side view of a container according to the present teachings.

With initial reference to FIG. 1, a container according to the present teachings is generally illustrated at reference numeral 10. The container 10 can be any suitable container having any suitable size and shape. For example, the container 10 can be a generally round bottle, and can be configured to be filled with 20 ounces of a commodity.

The commodity may be in any form, such as a solid or semi-solid product. For example, the commodity can include water, tea, or juice, and may be introduced into the container 10 during a thermal process, typically a hot-fill process. For hot-fill bottling applications, bottlers generally fill the container 10 with a product at an elevated temperature between approximately 155° F. to 210° F. (approximately 68° C. to 99° C.) and seal the container 10 with a closure before cooling. In addition, the container 10 may be suitable for other high-temperature pasteurization or retort filling processes or other thermal processes as well. In another example, the commodity may be introduced into the container 10 under ambient temperatures.

The container 10 can be a blow molded, biaxially oriented container with a unitary construction from a single or multi-layer material. A well-known injection stretch blow molding, heat-setting process for making the container 10 generally involves the manufacture of a preform of a polyester material, such as polyethylene terephthalate (PET), having a shape well known to those skilled in the art similar to a test-tube with a generally cylindrical cross section. The container 10 can be made from any suitable material, such as any suitable blow-molded thermoplastic or bio-resin, including polyethylene terephthalate (PET), high density or low density polyethylene (HDPE, LDPE), polypropylene (PP), polyethylene naphthalate (PEN), a PET/PEN blend or copolymer, and the like.

A preform version of the container 10 includes a support ring 26, which may be used to carry or orient the preform through and at various stages of manufacture. For example, the preform may be carried by the support ring 26, the support ring 26 may be used to aid in positioning the preform in a mold cavity, or the support ring 26 may be used to carry an intermediate container once molded. At the outset, the preform may be placed into the mold cavity such that the support ring 26 is captured at an upper end of the mold cavity. In general, the mold cavity has an interior surface corresponding to a desired outer profile of the container 10.

In one example, a suitable machine places the preform heated to a temperature between approximately 190° F. to 300° F. (approximately 88° C. to 150° C.) into the mold cavity. The mold cavity may be heated to a temperature between approximately 250° F. to 350° F. (approximately 121° C. to 177° C.). A stretch rod apparatus stretches or extends the heated preform within the mold cavity to a length approximately that of the intermediate container thereby molecularly orienting the polyester material in an axial direction generally corresponding with the central longitudinal axis of the container 10. While the stretch rod extends the preform, air having a pressure between 200 PSI to 600 PSI (1.38 MPa to 4.14 MPa) assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized air holds the mostly biaxial molecularly oriented polyester material against the mold cavity for a period of about 300 milliseconds to about 5 seconds before removal of the intermediate container from the mold cavity. This process is known as heat setting and results in the container 10 being suitable for filling with a product at high temperatures.

Other manufacturing methods may be suitable for manufacturing the container 10. For example, extrusion blow molding, one step injection stretch blow molding, and injection blow molding, using other conventional materials including, for example, polyethylene terephthalate (PET), high density or low density polyethylene (HDPE, LDPE), polypropylene (PP), polyethylene naphthalate (PEN), a PET/PEN blend or copolymer, and various multilayer structures may be suitable for manufacturing the container 10. Those having ordinary skill in the art will readily know and understand plastic container manufacturing method alternatives.

The container 10 generally includes a first end 12 and a second end 14, which is opposite to the first end 12. A longitudinal axis A of the container 10 extends through an axial center of the container 10 between the first end 12 and the second end 14. At the first end 12, an aperture or opening 20 is generally defined by a finish 22 of the container 10. Extending from an outer periphery of the finish 22 are threads 24, which are configured to cooperate with corresponding threads of any suitable closure in order to close the opening 20, and thus close the container 10. Extending from an outer periphery of the container 10 proximate to the finish 22, or at the finish 22, is the support ring 26. The support ring 26 can be used to couple with a blow molding machine for blow molding the container 10 from a preform, for example, as explained above.

Extending from the finish 22 is a neck 30 of the container 10. The neck 30 extends to a shoulder 32, which gradually slopes outward and away from the longitudinal axis A as the shoulder 32 extends down and away from the finish 22 towards the second end 14 of the container 10. The shoulder 32 extends to a body 40 of the container 10.

At least the body 40 and the shoulder 32 define an internal volume 42 of the container 10. The container 10 includes a sidewall 44, which can define one or more ribs 46 about the container 10. Any suitable number of ribs 46 can be included, and the ribs 46 can have any suitable shape and size. For example, the container 10 can include six ribs 46A-46F. Rib 46A can be between the shoulder 32 and the body 40. Rib 46A can be deeper than each one of the ribs 46B-46F. Ribs 46C, 46D, and 46E can be defined by the body 40, and can each be of a similar size and shape as illustrated, or can have different sizes and/or shapes. Ribs 46B and 46F can be on opposite sides of ribs 46C-46E, and can extend deeper into the container as compared to ribs 46C-46E.

The container 10 further includes a base 50. The body 40 extends from the neck 30 to the base 50, which is at the second end 14 of the container 10. With additional reference to FIGS. 2A, 2B, and 3, the base 50 will now be described in detail.

The base 50 generally includes a standing surface 52, a center push-up portion 54, and a diaphragm 60. The standing surface 52 is at an outer periphery of the base 50 and can be circular or generally circular. The standing surface 52 is configured to support the container 10 upright, such as on a planar surface. The center push-up portion 54 is at a center of the base 50. The longitudinal axis A extends through an axial center of the center push-up portion 54.

The diaphragm 60 surrounds the center push-up portion 54, and extends from the center push-up portion 54 to the standing surface 52. The diaphragm 60 is generally curved, such that the diaphragm 60 is concave as viewed from a point external to the container 10 at the base 50. The diaphragm 60 can be curved along its entire length from the standing surface 52 to the center push-up portion 54. Alternatively, the diaphragm 60 can be curved along a substantial portion of its length, but less than an entirety of its length, from the standing surface 52 to the center push-up portion 54. For example, the diaphragm 60 can be curved from a transitional radius 62 towards the standing surface 52, and then extend generally linearly to the standing surface 52 at a point proximate to the standing surface 52. In general, the diaphragm 60 is a plurality of curves and radii.

Figure 2A:
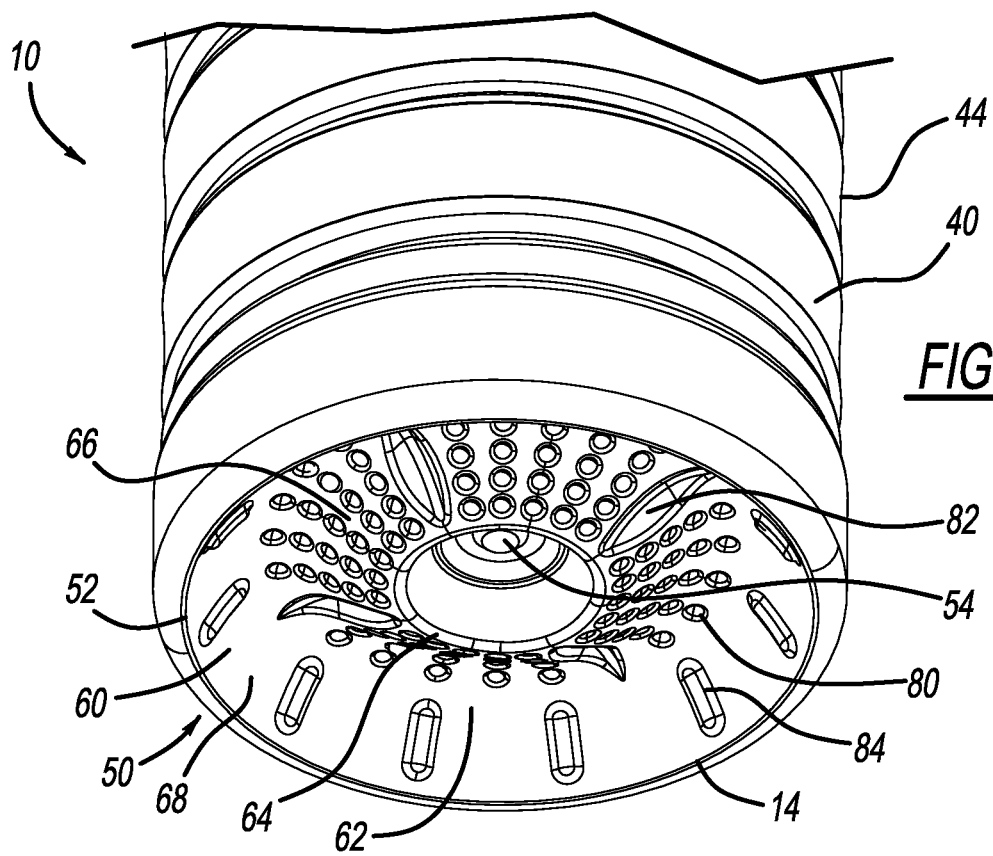
FIG. 2A is a perspective view of an exemplary container base according to the present teachings.
Figure 2B:
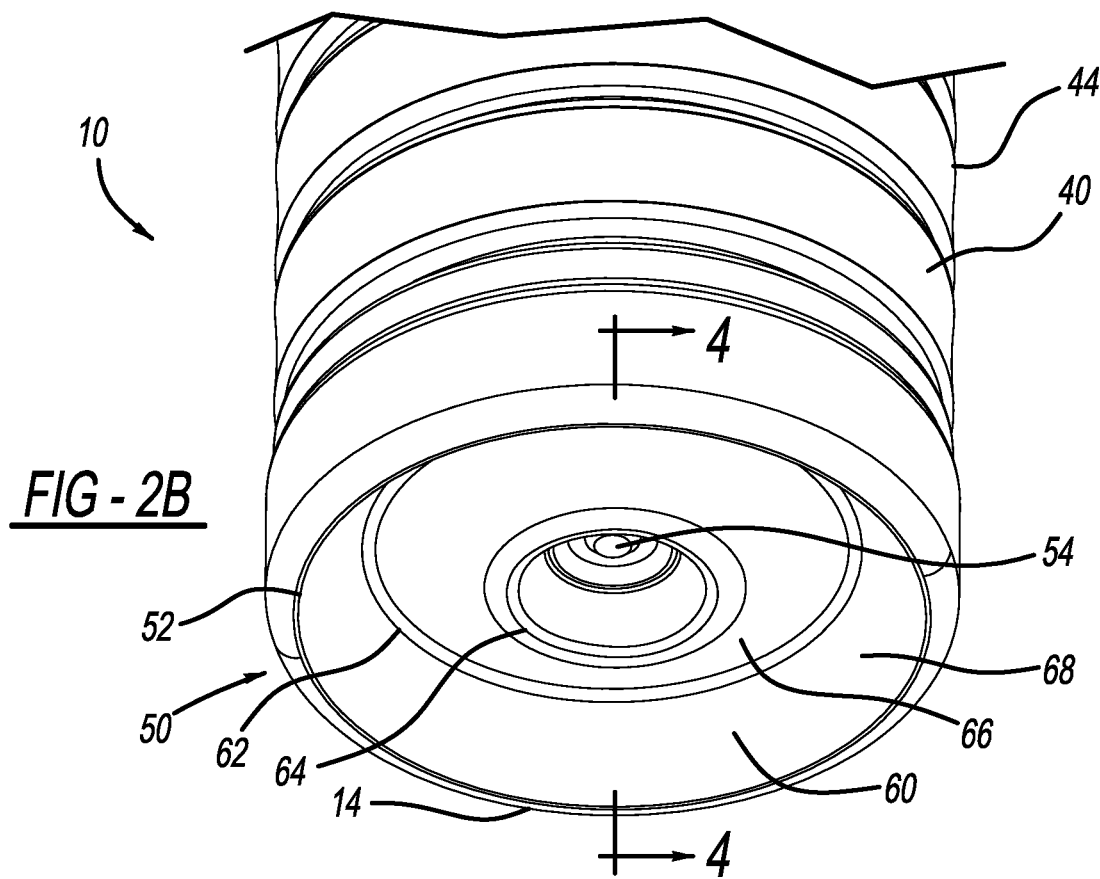
FIG. 2B is a perspective view of another container base according to the present teachings.

FIGS. 2A and 2B illustrate the base 50 in a neutral, or as-blown, position. In at least the neutral position, the diaphragm 60 includes the transitional radius 62 and an isolation radius 64. The diaphragm 60 is furthest from the second end at the transitional radius 62 when the base 50 is in the neutral position. The isolation radius 64 is where the diaphragm and the center push-up portion 54 meet. On an inner side of the diaphragm 60 between the transitional radius 62 and the isolation radius 64 is an inner diaphragm portion 66. On an outer side of the diaphragm 60 between the transitional radius 62 and the standing surface 52 is an outer diaphragm portion 68. When the base 50 is in the neutral position, the inner diaphragm portion 66 curves or slopes away from the first end 12 to the isolation radius 64, and the outer diaphragm portion 68 curves or slopes away from the first end 12 to (or proximate to) the standing surface 52. In the neutral position, the diaphragm 60 can have a generally smooth shape as illustrated. Alternatively, in the neutral position the diaphragm 60 can have a generally deformed spherical shape including a plurality of corners.

Figure 3:
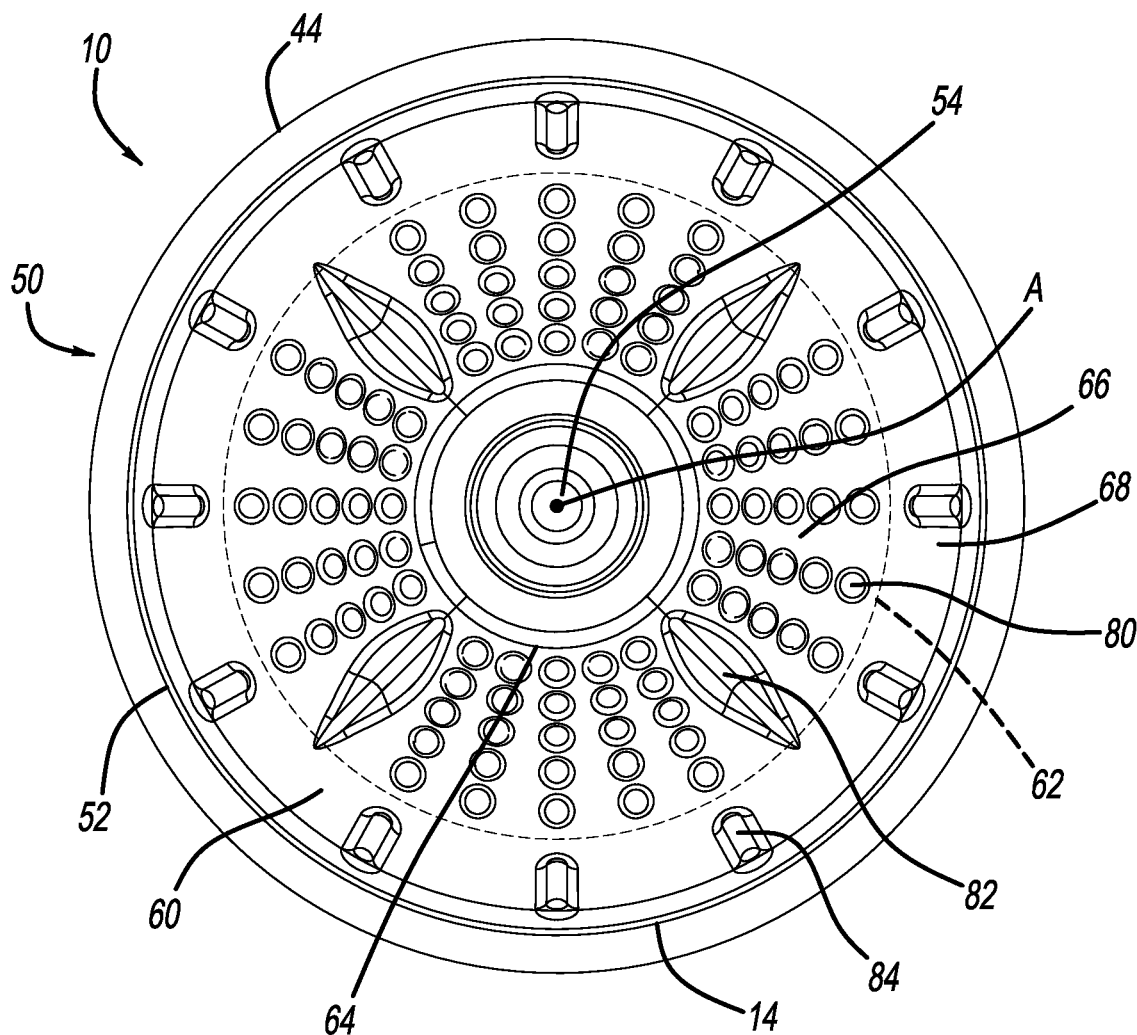
FIG. 3 is a plan view of the container base of FIG. 2A.

The base 50 can includes a plurality of surface features. For example and as illustrated in FIGS. 2A and 3, the base 50 can include dimples 80, gussets 82, and/or ribs 84. The dimples 80, gussets 82, and ribs 84 are optional, however, and need not be included. Without the dimples 80, gussets 82, and ribs 84, the diaphragm 60 will be generally smooth, as illustrated in FIG. 2B for example.

Any suitable number of dimples 80 can be included, and the dimples 80 can be provided at any suitable location. For example and as illustrated in FIGS. 2A and 3, a plurality of dimples 80 extending inward into the diaphragm 60 can be provided at the inner diaphragm portion 66. The dimples 80 can be arranged in any suitable manner, such as in spaced apart rows that extend radially from the center push-up portion 54. The rows of dimples 80 can extend from the isolation radius 64 to the transitional radius 62, or from about the isolation radius 64 to about the transitional radius 62. The rows of dimples 80 may also extend across the transitional radius 62.

Any suitable number of the gussets 82 can be included, and the gussets 82 can be provided at any suitable location. For example and as illustrated in FIGS. 2A and 3, a plurality of gussets 82 extending inward into the diaphragm 60 can be provided at the inner diaphragm portion 66. The gussets 82 can be arranged in any suitable manner, such as spaced apart evenly about the inner diaphragm portion 66, with rows of dimples 80 between the gussets 82. For example and as illustrated in FIGS. 2A and 3, four rows of dimples 80 can be arranged between neighboring gussets 82. Each gusset 82 can be formed in any suitable manner, such that each gusset 82 can have different shapes and sizes or uniform shapes and sizes. For example and as illustrated in FIGS. 2A and 3, each gusset 82 is tapered and most narrow at opposite ends thereof, and widest at generally a mid-point along a length thereof. The gussets 82 can also extend deepest into the diaphragm 60 at the mid-point along the length thereof, and be most shallow (or extend the least into the diaphragm 60) at the ends thereof.

Any suitable number of the ribs 84 can be included at any suitable location. For example and as illustrated in FIGS. 2A and 3, a plurality of ribs 84 extending outward from the outer diaphragm portion 68 can be arranged about the outer diaphragm portion 68. The ribs 84 can be evenly spaced apart about the outer diaphragm portion 68, and can extend lengthwise such that a first end is at or approximate to the standing surface 52, and a second end opposite to the first end is at or proximate to the transitional radius 62. Each rib 84 can be generally aligned with a row of the dimples 80 in plan view, as illustrated in FIG. 3, and offset from the gussets 82. Neighboring ribs 84 can be spaced apart by one of the rows of dimples 80, such that one of the rows of dimples 80 is generally between them. Each gusset 82 can be arranged between neighboring ribs 84, as illustrated in the plan view of FIG. 3.

Figure 4:
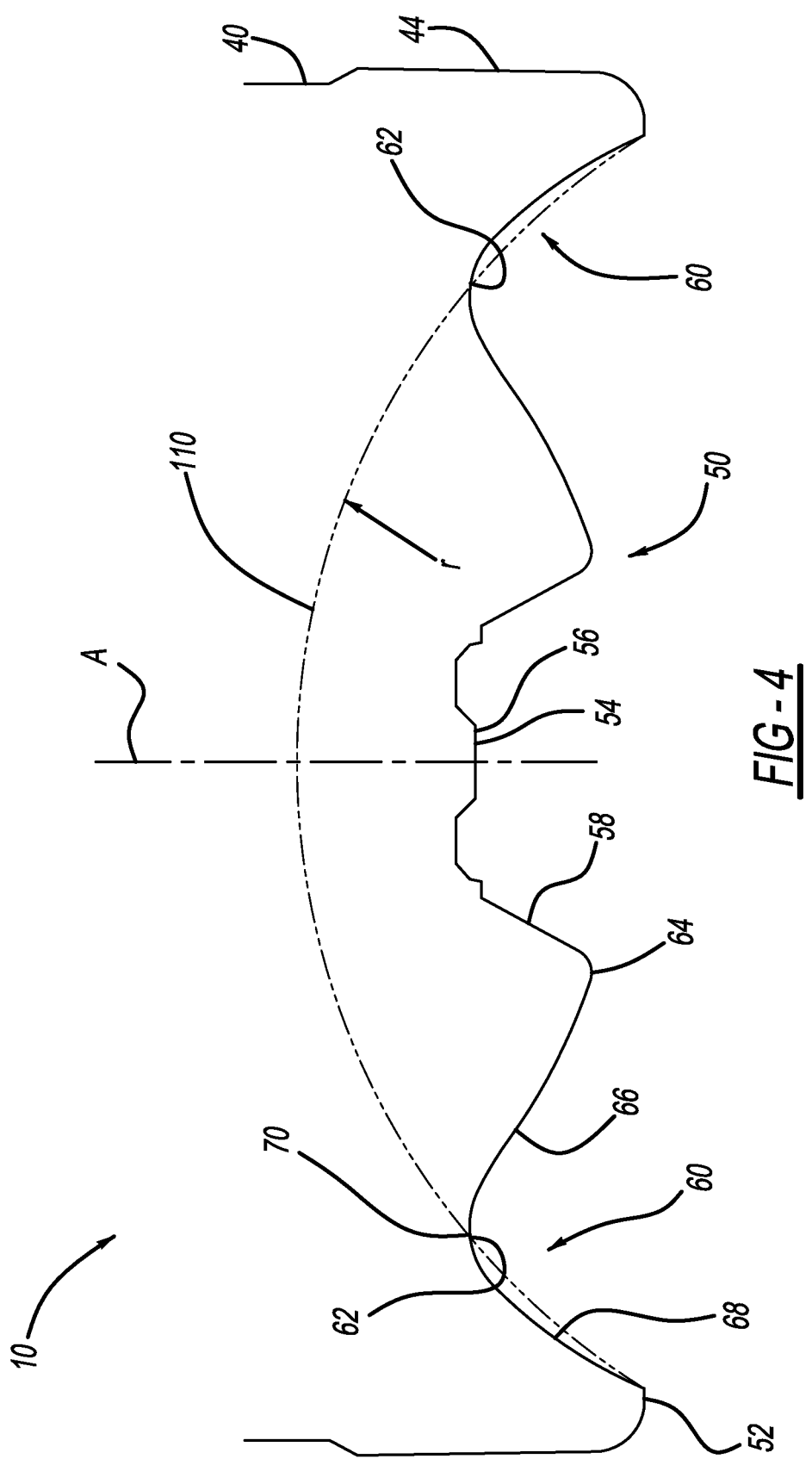
FIG. 4 is a cross-sectional view, taken along line 4-4 of FIG. 2B, of the container base of FIG. 2B in a neutral position.
Figure 5:
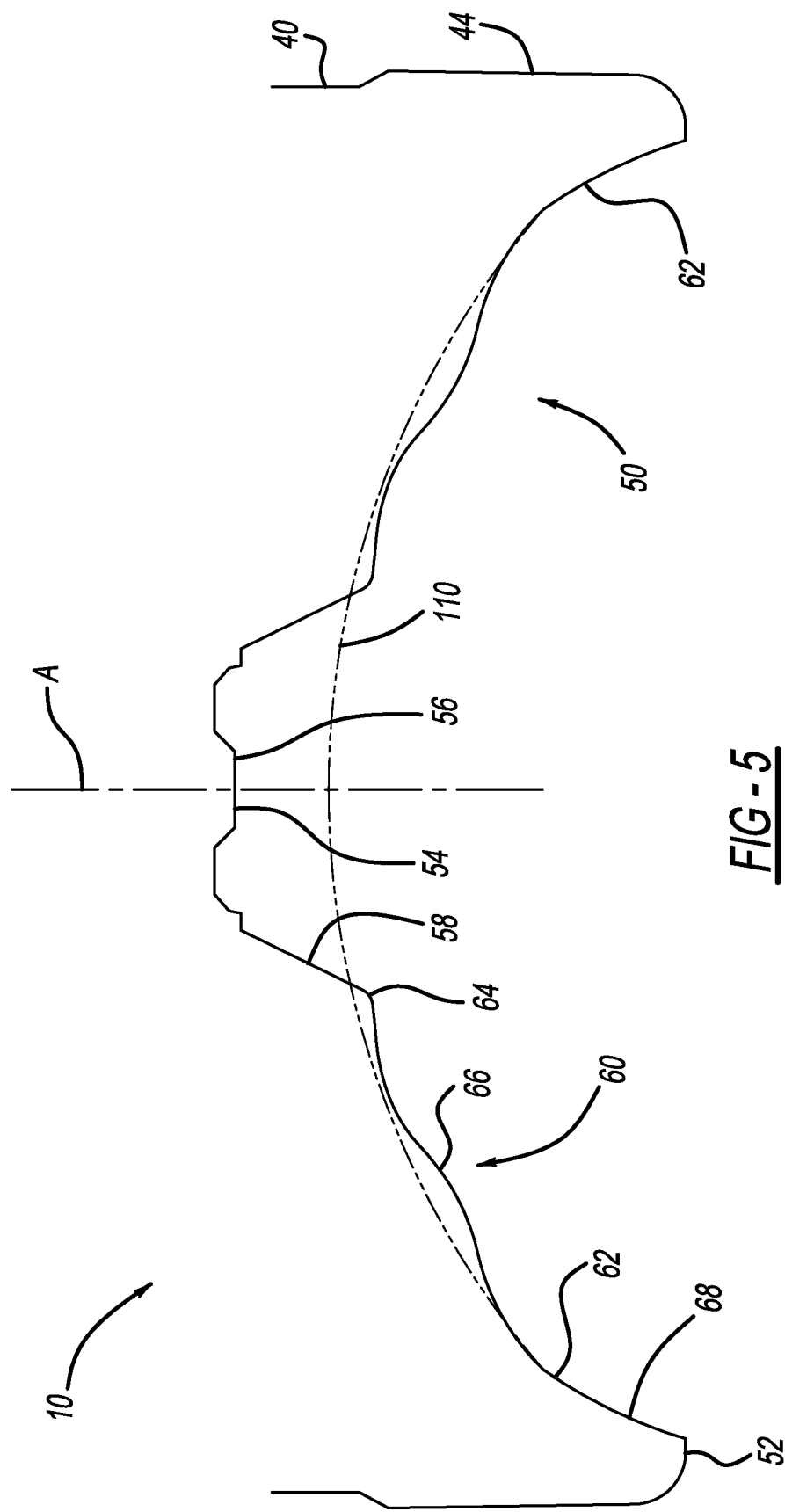
FIG. 5 is a cross-sectional view of the base of FIG. 2B in an activated position.

The surface features of the base 50, such as the dimples 80, the gussets 82, and the ribs 84, facilitate movement of the base 50 from the neutral position of FIGS. 2A, 2B, 3, and 4, to the activated position of FIG. 5, and retention of the base 50 in the activated position of FIG. 5. For example, the dimples 80 facilitate movement of the base 50 from the neutral position to the activated position by allowing the base 50 to deform. The gussets 82 provide the base 50 with a strengthening force, which helps maintain the base 50 in the activated position of FIG. 5 by resisting reversion forces urging the base 50 from the activated position to the neutral position. The base 50 can include any other suitable surface features in addition to, or in place of, the dimples 80, the gussets 82, and the ribs 84.

Movement of the base 50 from the neutral position (FIGS. 2A, 2B, 3, and 4, for example) to the activated position (FIG. 5, for example), will now be further described. After the container 10 is hot-filled, the container 10 is capped and allowed to cool. The base 50 is then activated such that it moves from the neutral position (FIG. 4, for example) to the activated position (FIG. 5, for example), at which the diaphragm 60 is generally aligned along a target final hemisphere 110. The target final hemisphere 110 extends across the base 50 from the standing surface 52 (or about the standing surface 52) and represents a target position for the diaphragm 60 to be aligned with (or generally aligned with) when the base 50 is in the activated position of FIG. 5. The target final hemisphere 110 represents a position at which reversion force required to move the base 50 from the activated position (FIG. 5) to the neutral position (FIG. 4) is greatest and/or at an acceptable level. The target final hemisphere 110 can have any suitable radius (r). Generally, the smaller the radius (r), the greater the activation force required to move the base 50 from the neutral portion to the activated position, as well as the greater the reversion force required to move the base 50 from the activated position to the neutral position. The base 50 can be activated in any suitable manner, such as mechanically with any suitable actuation device, or automatically. For mechanical activation, any suitable device can be used, such as a plunger or other solid device driven mechanically, with air, hydraulically, with servo, or with any other suitable device or method.

The base 50 may also be configured such that in response to the vacuum created during the hot-fill process, the diaphragm 60 will automatically invert from the neutral position of FIG. 4 to the activated position of FIG. 5 when the material of the container 10, particularly at the base 50, is thin enough and the surface features are arranged suitably. For example, arrangement of the dimples 80, the gusset 82, and the ribs 84 as illustrated in FIGS. 2A and 3, and a base thickness having the following measurements will generally provide an automatically actuating base: for a 23 g preform: 0.008" sidewall 44, 0.009" outer diaphragm portion 68, 0.011" transitional radius 62, 0.012" inner diaphragm portion 66, and 0.013" isolation radius 64; and for a 25 g preform with a 4.0 g base: 0.009" sidewall 44, 0.009" standing surface 52, 0.010" outer diaphragm portion 68, 0.012"-0.013" transitional radius 62, 0.019" inner diaphragm portion 66, and 0.020" isolation radius 64. The base 50 is thus generally thinner at the sidewall 44 than at the isolation radius 64, and gradually becomes thicker from the sidewall 44 to the isolation radius 64.

Figure 6:
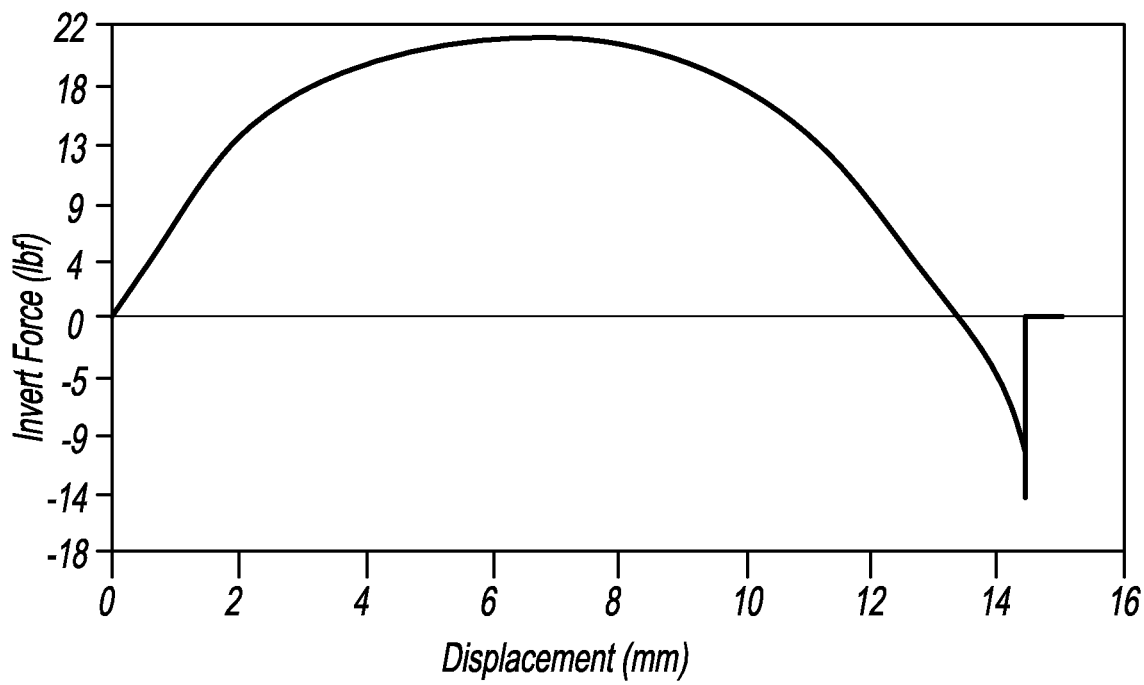
FIG. 6 illustrates displacement of a container base according to the present teachings in response to varying amounts of inversion force.

FIG. 6 is an exemplary graph showing the force required to mechanically invert the base 50. For example and as illustrated, the inversion force increases to about 22 lbs to displace the base 50 slightly greater than 6 mm. After about 6 mm of displacement, the amount of inversion force required to displace the base 50 decreases to zero, at which point the base 50 begins to move without additional force or assistance to lock the base 50 in the activated position of FIG. 5. Also, any residual vacuum within the container 10 caused by the hot-fill process may help retain the base 50 in the activated position.

The diaphragm 60 moves from the neutral position of FIG. 4 to the activated position of FIG. 5 as the transitional radius 62 propagates along the diaphragm 60 towards the isolation radius 64. Specifically, the outer diaphragm portion 68 moves slightly inward in the direction of the longitudinal axis A, or generally remains in its neutral position, such that the outer diaphragm portion 68 is aligned along, or nearly aligned along, the target final hemisphere 110. The inner diaphragm portion (or inversion radius) 66 moves towards the first end 12 of the container 10 until it nearly reaches, or is generally aligned along, the target final hemisphere 110. As the inner and outer diaphragm portions 66 and 68 move toward the target final hemisphere 110, the transitional radius 62 generally propagates along the diaphragm 60 in response to internal or external inversion force. The transitional radius 62 is generally at the center of the diaphragm 60, and the highest point of the transitional radius 62 is a node 70 (FIG. 4 for example) of the diaphragm 60. The node 70 can be located at any suitable position along a length of the diaphragm 60, such as between +20% and −20% of the length of the diaphragm 60. In other words, the transitional radius 62 and node 70 can be located a distance away from the standing surface 52, and a distance away from the isolation radius 64, greater than about 20% of the length of the total diaphragm 60.

The isolation radius 64 of the diaphragm 60 also moves towards the first end 12 of the container 10 such that the isolation radius 64 is at, or in close proximity to, the target final hemisphere 110. The isolation radius 64 moves from the neutral position to the activated position in a direction that is generally parallel to the longitudinal axis A of the container 10. As the isolation radius moves to the target final hemisphere, a curve radius of the isolation radius increases.

The center push-up portion 54 moves along the longitudinal axis A from the neutral position of FIG. 4 to the activated position of FIG. 5. The center push-up portion 54 generally includes a base 56, and an interfacial portion 58 that connects the base 56 to the isolation radius 64. As the center push-up portion 54 moves from the neutral position, the base 56 and the interfacial portion 58 pass across the target final hemisphere 110. In the activated position of FIG. 5, the center push-up portion 54 is arranged on a side of the target final hemisphere 110 closest to the first end 12 of the container 10, and the isolation radius 64 is seated on, or proximate to, the target final hemisphere 110.

Figure 7:
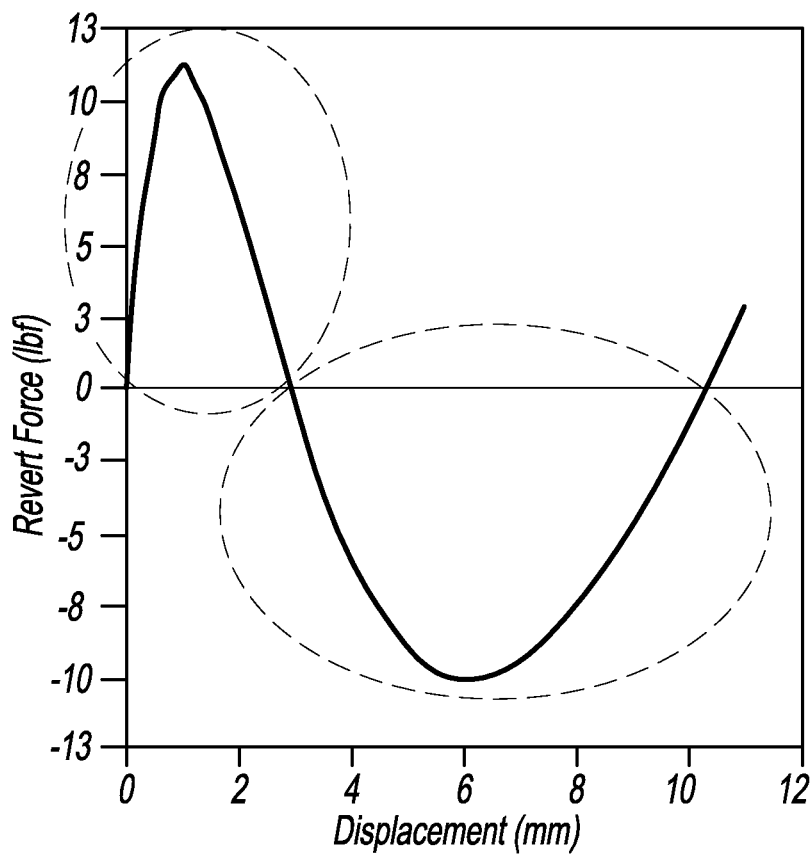
FIG. 7 illustrates displacement of a container base according to the present teachings in response to varying amounts of reversion force.

In the activated position of FIG. 5, the base 50 resists movement back to the neutral position of FIG. 4, unless reversion force exerted on the base 50 exceeds a particular threshold. For example and with reference to FIG. 7, when the base 50 is in the activated position the base 50 can be configured to be only minimally displaced until the reversion force is 11.2 lbs., or about 11.2 lbs. After overcoming the reversion threshold of 11.2 lbs., less reversion force will be required to displace the base 50, until the base 50 is displaced about 3.0 mm. After being displaced about 3.0 mm, the base 50 will revert to the neutral position even if additional reversion force is not applied. The base 50 can have any suitable size and shape, and can be provided with various surface features in addition to, or in place of, the dimples 80, gussets 82, and the ribs 84. The container 10 does not require a deep stroke base, and can thus use a shorter activation stroke resulting in more efficient and less costly mold tooling and machine design.

Movement of the base 50 from the neutral position of FIG. 4 to the activated position of FIG. 5 provides numerous advantages. For example, any residual vacuum resulting from the hot-fill process is reduced or eliminated. A positive pressure may also be introduced into the vacuum, which will typically prevent denting and fix any dents present in the container by forcing them outward. A positive pressure state in the container allows the container 10 to have lighter weight and thinner walls, while providing the same or better performance such as improved top load as compared to heavier containers having residual internal vacuum.

Advantageously, the base 50 is able to move from the neutral position of FIG. 4 to the activated position of FIG. 5 in response to only the vacuum formed during the hot-fill process, or in response to only a minimal amount of external force being applied. The base 50 will then advantageously remain in the activated position of FIG. 5 and withstand a reversion force of a significant amount, such as about 11.20 lbs of force, as measured in an empty container 10. The base 50 will only return to the neutral position if the reversion force exceeds a significant threshold, such as about 11.20 lbs of force. Thus, the container 10, and the base 50 in particular, performs better during drop testing than other containers with a movable base.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A container comprising:
   a finish defining an opening at a first end of the container that provides access to an internal volume defined by the container; and
   a base portion including a diaphragm that is concave relative to an exterior of the container, an outer portion of the diaphragm extends from a standing surface of the container to a transitional radius of the diaphragm, an inner portion of the diaphragm extends from the transitional radius to a center push-up portion of the base portion, the standing surface is at a second end of the container opposite to the first end;
   wherein the diaphragm is configured to move from an as-blown configuration to an activated configuration, as the diaphragm moves from the as-blown first configuration to the activated configuration the outer portion of the diaphragm moves away from the first end of the container and the inner portion of the diaphragm moves towards the first end of the container;
   wherein the transitional radius moves along the diaphragm as the diaphragm moves from the as-blown configuration to the activated configuration; and
   wherein the diaphragm is configured to be mechanically moved from the as-blown configuration to the activated configuration.

2. The container of claim 1, wherein movement of the diaphragm from the as-blown configuration to the activated configuration induces positive pressure within the internal volume.

3. The container of claim 1, wherein movement of the diaphragm from the as-blown configuration to the activated configuration reduces vacuum within the internal volume.

4. The container of claim 1, wherein the transitional radius is a node of the diaphragm.

5. The container of claim 1, wherein in the activated configuration the diaphragm has a generally hemispherical cross-sectional shape and is configured to resist reversion forces to retain the diaphragm in the second configuration.

6. The container of claim 1, wherein the diaphragm includes a plurality of dimples.

7. The container of claim 1, wherein the diaphragm includes a plurality of gussets.

8. The container of claim 1, wherein the diaphragm includes a plurality of ribs.

* * * * *